March 14, 1933. B. F. GRAVELY 1,901,293
MOWING DEVICE
Filed Aug. 8, 1931 2 Sheets-Sheet 1
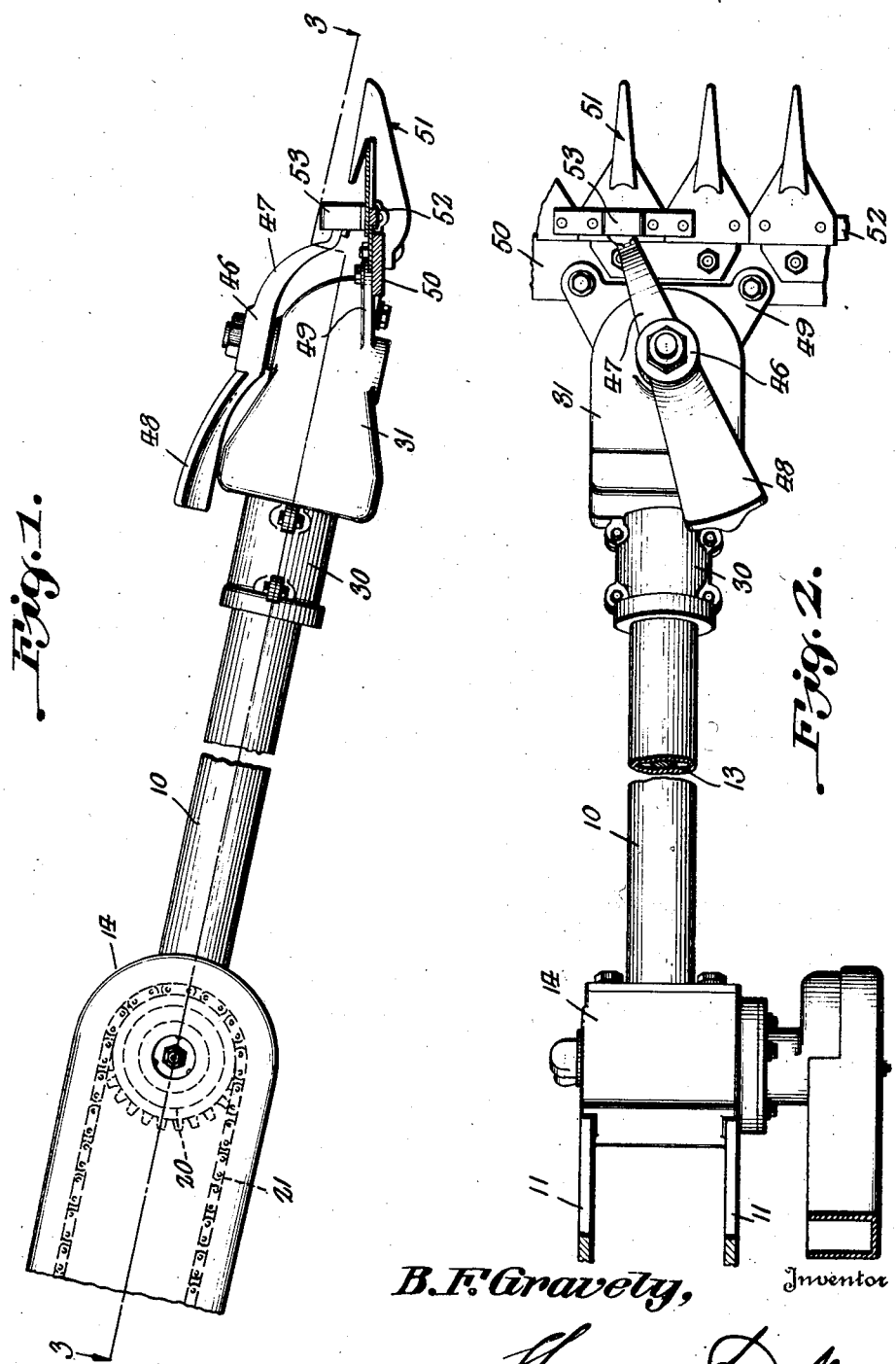
B.F. Gravely, Inventor March 14, 1933.                B. F. GRAVELY                1,901,293
                                MOWING DEVICE
                             Filed Aug. 8, 1931           2 Sheets-Sheet 2
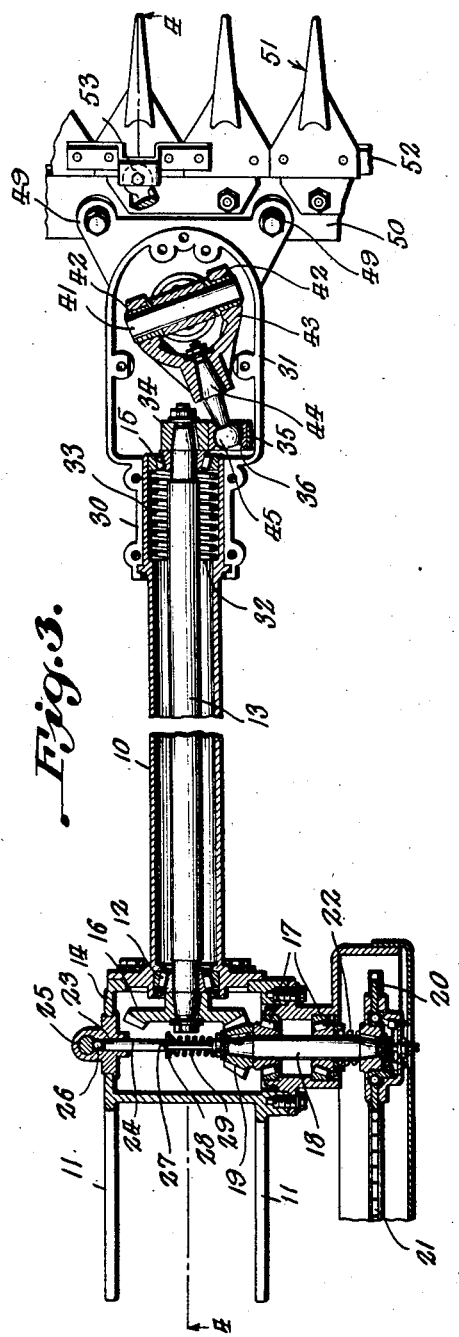
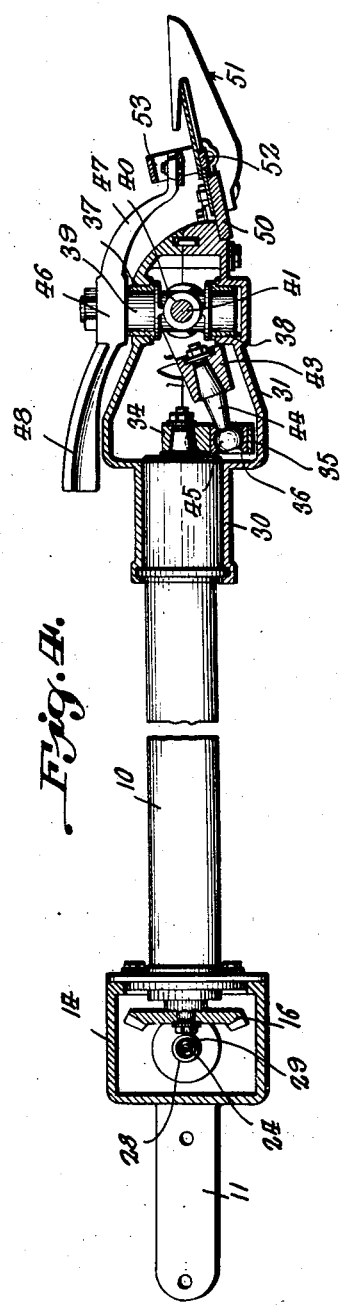
B. F. Gravely, Inventor
By Horace C. _____
                                Attorney Patented Mar. 14, 1933

1,901,293

UNITED STATES PATENT OFFICE

BENJAMIN F. GRAVELY, OF DUNBAR, WEST VIRGINIA

MOWING DEVICE

Application filed August 8, 1931. Serial No. 555,972.

This invention relates to new and useful improvements in driving mechanisms, and particularly to driving mechanisms especially adapted for use in connection with the cutting bars of mowing machines.

One object is to provide a mowing machine of this character which includes improved means for driving the cutter bar of such machine in a more efficient manner than with similar devices heretofore.

Another object is to provide a driving means for the cutter bar of a mowing machine which is simple in construction, and wherein the balance or equilibrium is properly maintained in the connected and operating parts, which will result in an effective and efficient machine of this character.

Other objects and advantages will be apparent from the following description when taken in connection with the accompanying drawings.

In the drawings:

Figure 1 is a side elevation of the driving mechanism of a mowing machine made in accordance with the present invention.

Figure 2 is a top plan view of the same.

Figure 3 is a horizontal sectional view on the line 3—3 of Figure 1.

Figure 4 is a vertical sectional view on the line 4—4 of Figure 3.

Referring particularly to the accompanying drawings, 10 represents a tubular casing, one end of which is secured in a casing 14, said casing being provided with arms 11 for attachment to the frame of a motor containing device, not shown. Extending longitudinally within the tubular casing, and having one end properly supported in the anti-friction bearings 12, mounted in said casing 14, is a shaft 13, the other end of said shaft being supported in similar bearings 15, in the other end of said tubular casing 10. The first-named end of the shaft 13 extends into the casing 14, where it is provided with a bevel gear 16. Extending laterally from the casing 14, and suitably supported in antifriction bearings 17, is a shaft 18, the inner end of which is provided with a bevel gear 19, meshing with the bevel gear 16, and having on its outer end a sprocket wheel 20, which receives power, from the engine (not shown) by means of the chain 21. Surrounding the outer end of the said shaft 18, and bearing against the carrier of the bearings 15, and said sprocket wheel 20, is a coil spring 22. In the opposite side of the casing 14, in alinement with the shaft 18, is a recess 23, and disposed in said recess is one end of a rod 24, and also disposed in said recess, between the end of the rod, and a transverse member 25, therein, is a ball 26, which serves as a thrust bearing for the rod 24. A slight reduction in diameter is made in the rod 24, to produce the shoulder 27, and engaged on said reduced portion, and bearing against said shoulder, is a disk 28. A coil spring 29 encircles the rod 24, and has its ends bearing against the said disk, and the inner end of the shaft 18.

The other end of the tubular casing 10 is detachably secured within the longitudinally split tubular extension 30, of a casing 31, said end of the casing being formed with an interior shoulder 32, against which one end of a coil spring 33 bears, the other end of said spring bearing against the carrier of the bearings 15, located in the end of the casing 10.

The last-mentioned end of the shaft 13 extends into the casing 31, as shown, and mounted on said end of the shaft is a disk 34, having a radial arm 35, provided with a socket 36, to which reference will be made later herein.

Disposed vertically in the other end of the casing 31, and having its upper and lower ends journaled in the bearing sockets 37 and 38, is a rocker shaft 39, and formed transversely through said shaft is an opening 40, in which is disposed a pin or shaft 41. The ends of this shaft 41 project from the sides of the shaft 39 and are received in suitable bushings 42, in the ends of the arms of the yoke 43. The intermediate portion of the yoke 43 carries a stem 44, the outer end of which is provided with a terminal ball 45, held in the bearing socket 36, of the arm 35, whereby when the shaft 13 rotates, motion is imparted to the rocker shaft 39, through the medium of the yoke 43. The upper end of the rock shaft 39 extends beyond the upper wall of the casing 31, and secured on the said upper end of the shaft is the intermediate portion of a lever 46, one end of which extends forwardly and downwardly, as at 47, while the rear portion extends upwardly and rearwardly, as at 48, this latter portion being of considerable thickness, whereby to serve as a counterbalance for the lever.

Extending forwardly in divergent relation are the apertured arms 49, which are properly bolted to the finger-guard carrying bar 50, of a mower cutting mechanism, represented, as a whole, by the numeral 51. This cutting mechanism also includes the cutter bar 52, which is provided with the bearing socket 53, and which receives the before-mentioned end of the lever 46.

From the foregoing it will be seen that, as the shaft 13 rotates, the turning of the disk 34 will cause a rocking movement, in the yoke 43, which will be transmitted to the rock shaft 39, into rocking movement, resulting in the rocking of the lever 46, and the reciprocation of the cutter bar 52, and the successful operation of the mowing device.

What is claimed is:

1. A mowing device comprising a tubular support, a cutting mechanism including a finger guard carrying bar and a cutter bar, a casing secured to said guard carrying bar, and mounted on said support for lateral rocking movement, a drive shaft within said support having a rotatable head fixed thereon and operable within said casing, a vertical rock shaft supported in the casing, a yoke straddling said rock shaft and pivotally connected thereto, an arm on the yoke pivotally connected with said head, and a lever secured intermediate its length on the rock shaft and having one end connected with said cutter bar and the other end free.

2. A mowing device comprising a cutting mechanism including a finger guard carrying bar and a cutter bar, a casing secured to said guard carrying bar, a drive shaft having a rotatable head fixed thereon operable within said casing, a vertical rock shaft mounted within the casing, a yoke having its arms arranged in straddling relation to said rock shaft and pivotally connected thereto, and an arm secured intermediate its length to an end of the rock shaft, said arm having one end enlarged to form a counterbalance weight and having its other end pivotally connected to said cutter bar.

3. A mowing device adapted to travel on the surface of the ground comprising a driving means including a shaft, and a cutting mechanism operable by said shaft, said cutting mechanism being pivotally mounted intermediate its length for rocking movement transversely of the direction of travel of the device.

4. A mower device comprising a cutting mechanism including a rock shaft, means for rocking said shaft, and an arm secured intermediate its length to an end of said rock shaft and having one end formed for operating the cutting bar of the cutting mechanism and the other end enlarged to provide a counterbalance weight.

In testimony whereof, I affix my signature.

BENJAMIN F. GRAVELY.